J. S. McWHIRTER.
TRUCK BRAKE.
APPLICATION FILED NOV. 12, 1908.
919,747.
Patented Apr. 27, 1909.
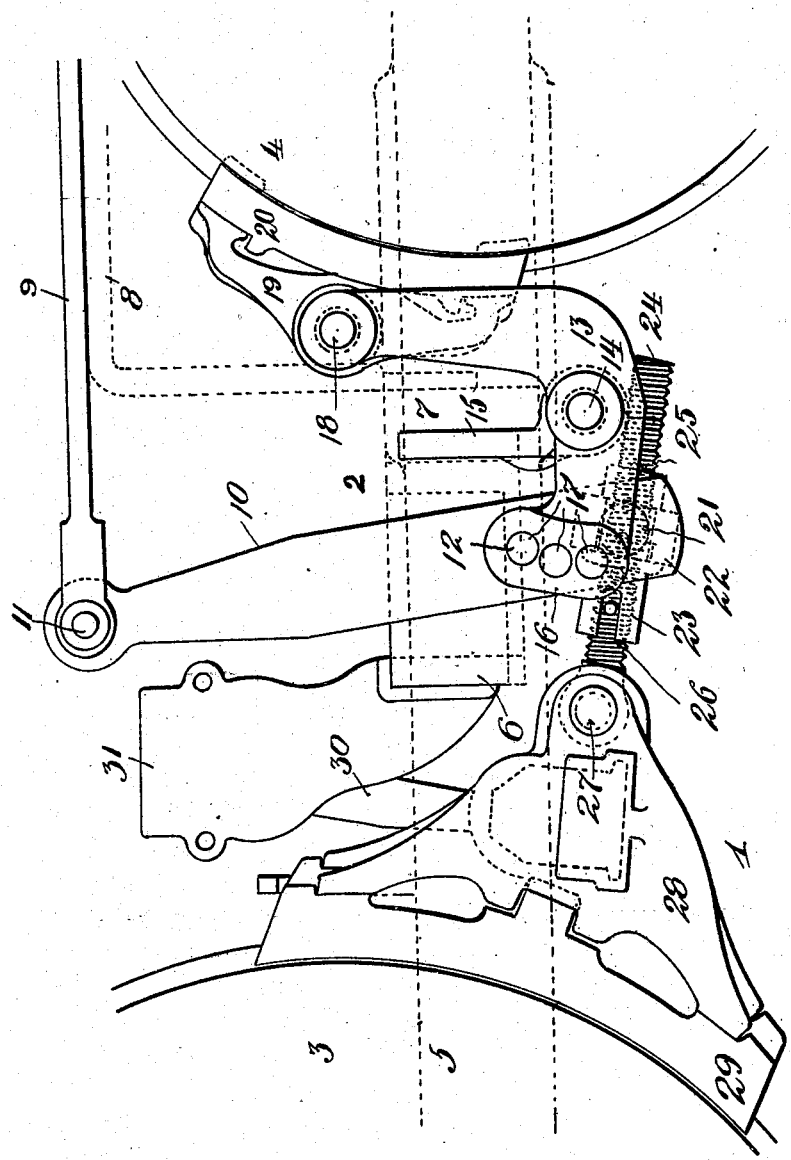
Witnesses:
C. T. Benjamin
G. J. Armand
Inventor
John S. McWhirter
By his Attorney
Joseph R. Levy

UNITED STATES PATENT OFFICE.

JOHN S. McWHIRTER, OF NEW YORK, N. Y., ASSIGNOR TO THE J. G. BRILL COMPANY, OF PHILADELPHIA, PENNSYLVANIA.

TRUCK-BRAKE.

No. 919,747.     Specification of Letters Patent.     Patented April 27, 1909.

Application filed November 12, 1908. Serial No. 462,255.

*To all whom it may concern:*

Be it known that I, JOHN S. MCWHIRTER, of the city, county, and State of New York, have invented a new and useful Improvement in Truck-Brakes, of which the following is a specification.

The object of my invention is to provide a brake of this class which will be suitable for trucks with large driving and small trailing wheels, known as maximum traction trucks, which brake is so arranged and disposed that when it is in use, pressure will be applied to the wheels in proportion to the weight carried by them. This object is accomplished by my invention, one embodiment of which is described below.

For a more particular description of my invention reference is to be had to the accompanying drawings, forming a part hereof, in which the figure is a side elevation of my improved brake. Only one side is shown as the other side is the same in all respects, so an illustration of one side will answer for both.

My improved brake 1 is applied to a truck 2, with the driving wheels 3 and trailing wheels 4. For convenience the truck is only partially shown, and what is shown is shown in dotted lines. The truck 2 is provided with the usual side frame 5, crossings 6 and 7 and a horizontal lever slide 8, all of which may be of the conventional construction. The truck also has other parts which it is not necessary to refer to in this case.

The truck 1 is provided with a horizontal lever 9 resting on the slide 8 and this horizontal lever 9 is connected at each end, in the conventional manner, to an upright lever 10 by means of a pivot 11. The lever 10 is also fulcrumed at 12 to a bell crank lever 13 fulcrumed at 14 to a bracket 15 secured to the crossing 7. The bell crank lever 13 has the pivot 12 in an enlarged head 16 and this head 16 is provided with a number of holes 17, as shown, all concentric with the fulcrum 14. This lever 13 is fulcrumed immediately under the crossing 7 and has its longer arm extending upwardly and its upper end terminates at a pivot 18 secured to the brake shoe holder 19 which holds a brake shoe 20 in the conventional manner, and presses the same against a trailing wheel 4. The wear of the brake shoe 20 can be compensated for by shifting the pivot 12 from one of said holes 17 to another hole 17, as is obvious.

The lower end of the upright lever 10 is pivoted to a trunnion 21 extending from a sleeve 22, shown in dotted lines on a nut 23 which turns on an eye-bolt 24. The nut 23 is locked in place by means of a cotter, not shown, passing through holes 25 in the bolt 24 and the registering slots 26 in the nut 23. By turning the nut 23 the position may be made forward as will prove below. The eye-bolt 24 turns on a pivot 27 in the brake shoe holder 28 which holds the brake shoe 29 in the conventional manner against the driving wheels 3. The brake shoe holder 28 is supported by a hanger 30 from a bracket 31 which is fixed to the crossing 6. The wear of the brake shoe 29 can be compensated for by turning the nut 23 on the eye-bolt 24 as above described.

When the horizontal lever 9 is put in tension, the upper end of the upright lever 10 is shifted to the right thereby forcing both brake shoes 20 and 29 against their respective wheels. A reverse movement of the horizontal lever 9 will withdraw these shoes from the wheels as is obvious. The location of the trunnion 21 and pivot 12, with regard to the fulcrum 14 determines the relative pressure of the brake shoes on the wheels. In the construction shown, pressure is applied to the wheels by the brake shoes in proportion to the weights carried by them.

While I have shown and described one embodiment of my invention, it is obvious that it is not restricted thereto, but is broad enough to cover all structures that come within the scope of the annexed claims.

What I claim is:

1. In a device of the class described, an upright lever, a bell crank lever pivoted thereto, a fulcrum for said bell crank lever, and means for supporting the same, a brake shoe holder carried by said bell crank lever, a second brake shoe holder, a trunnion pivotally connected to the upright lever, and means for connecting said trunnion and said second brake shoe holder and means for supporting said last mentioned brake shoe holder.

2. In a device of the class described, an upright lever, a bell crank lever and means for supporting the same, a brake shoe holder connected to said bell crank lever, a second brake shoe holder and means for supporting the same, an eye-bolt secured to said last mentioned brake shoe holder, a nut on said eye-bolt, a collar on said nut and a trunnion on said collar pivotally connected with said upright lever.

3. In a device of the class described, an upright lever, a bell crank lever, a brake shoe holder carried by said bell crank lever upon one side of its fulcrum, a connection between said upright lever and the bell crank lever upon the opposite side of its fulcrum, a second brake shoe holder, means for pivotally supporting the same, and a screw connection between the second brake shoe holder and the bell crank lever.

4. In a device of the class described, an upright lever, a bell crank lever, a brake shoe holder carried by said bell crank lever upon one side of its fulcrum, a connection between said upright lever and the bell crank lever upon the opposite side of its fulcrum, a second brake shoe holder, means for pivotally supporting the same, and a pivotal and screw connection between the second brake shoe holder and the bell crank lever.

Signed at the city, county and State of New York, this 10th day of November, 1908.

JOHN S. McWHIRTER.

Witnesses:
CHAS. A. BROOKS,
W. A. BUNCH.